S. W. SIMS.
WELL DRILLING TOOL.
APPLICATION FILED AUG. 4, 1913.

1,096,134.

Patented May 12, 1914.

Witnesses

Stephen W. Sims,
Inventor by C.A. Snow & Co.
Attorneys

UNITED STATES PATENT OFFICE.

STEPHEN W. SIMS, OF LOYALTON, CALIFORNIA.

WELL-DRILLING TOOL.

1,096,134. Specification of Letters Patent. Patented May 12, 1914.

Application filed August 4, 1913. Serial No. 782,984.

*To all whom it may concern:*

Be it known that I, STEPHEN W. SIMS, a citizen of the United States, residing at Loyalton, in the county of Sierra and State of California, have invented a new and useful Well-Drilling Tool, of which the following is a specification.

The device forming the subject matter of this application is a tool adapted to be employed in the boring of wells.

The invention aims to provide a tool of the type described which, working in a casing of a given diameter, will bore, below the foot of the casing a hole of greater diameter than the diameter of the casing.

The invention aims further, to provide a tool of the class described, through which, in operation, water may be forced readily.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
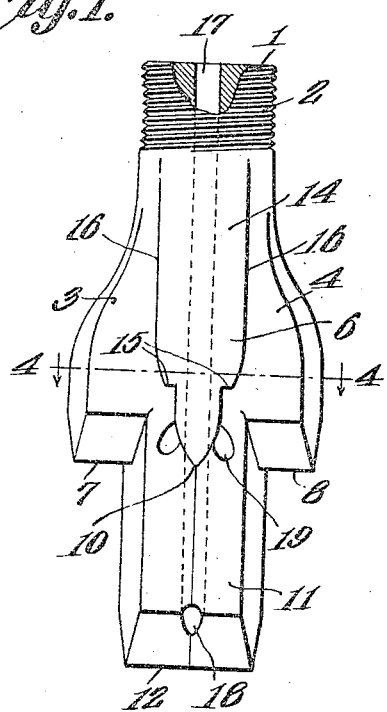
Figure 2:
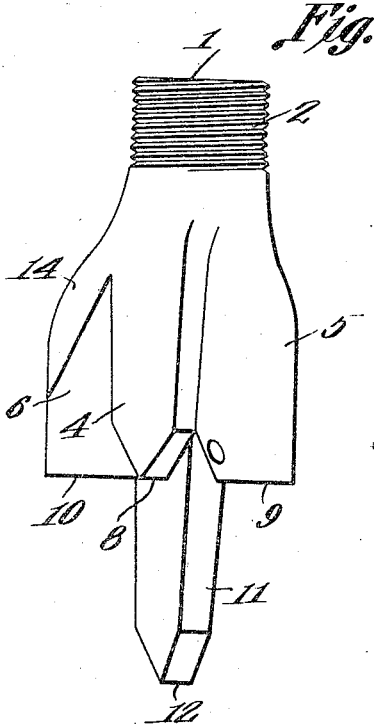
Figure 3:
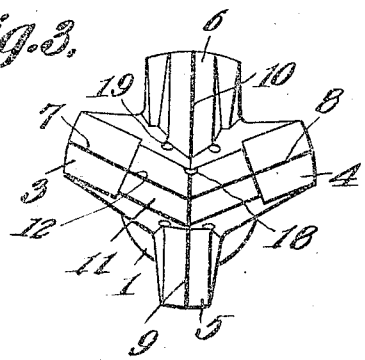
Figure 4:
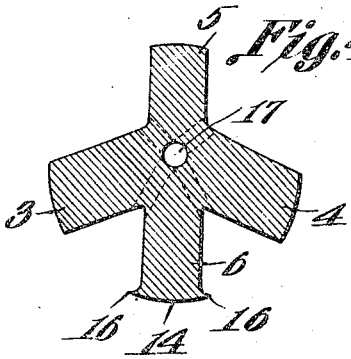

In the accompanying drawing: Figure 1 shows the tool in side elevation, parts being broken away; Fig. 2 is a side elevation, the structure being viewed at right angles to the showing of Fig. 1; Fig. 3 is an end elevation; Fig. 4 is a transverse section on the line 4—4 of Fig. 1.

The tool herein disclosed is shown as comprising a shank 1, which may be threaded at 2, or adapted in any other way for connection with the mechanism whereby the tool is reciprocated and rotated. The tool comprises a plurality of wings, the same being laterally extended from the axis of the shank, the several wings being denoted by the numerals 3, 4, 5 and 6. The wings 3 and 4, as will be understood best from Fig. 4, lie at an obtuse angle, and the wings 5 and 6 lie in a common plane.

The lower cutting edge of the wing 3 is denoted by the numeral 7, the lower cutting edge of the wing 4 is denoted by the numeral 8, the lower cutting edge of the wing 5 is denoted by the numeral 9 and the lower cutting edge of the wing 6 is denoted by the numeral 10. Noting Fig. 1, it will be observed that the cutting edges 7 and 8 are approximately equal in length. The cutting edge 10, however, is much longer than the cutting edge 9. All of these cutting edges, preferably lie in a common plane disposed transversely of the axis of the shank 1. Depending below the cutting edges 7, 8 9 and 10 is a centering bit 11, which may be of any desired length. The centering bit 11 may be variously formed at its lower end, but in its present instance the bit is shown as provided with a cutting edge 12. The lower end of the centering bit 11, however, may be varied in form without jeopardizing the utility of the invention. Adjacent its outer, upright edge, the wing 6 is equipped with a transverse rib 14. The lower edges 15 of the rib 14 project beyond the side faces of the lower end of the wing 6, as shown in Fig. 1, and are sharpened. The lateral edges 16 of the rib 14 are sharpened also. The shank 1 is provided with a bore 17 which is extended into the bit 11, the bit being provided with an outlet 18 which communicates with the bore 17. The bore 17 is provided with other outlets 19 discharging upon the side faces of the bit 11, above the cutting edges 7, 8, 9 and 10 of the respective wings. The outer edges of all of the wings 3, 4, 5 and 6 lie in a common circumference, which circumference approximates the interior diameter of the casing in which the tool is operated.

In practical operation, the cutting edges 7, 8, 9 and 10 of the several wings operate upon a reciprocation of the tool. The cutting bit 11 serves to center the device and when the bit is rotated, the edge 10 of the wing 6 projecting at its outer end beyond the outer face of the casing will enlarge the hole below the lower end of the casing; to a diameter exceeding the external diameter of the casing. Thus, illustrating by a concrete example, the bit herein disclosed may be passed through a two inch pipe or casing and will cut a three inch hole below the lower end of the casing, thereby permitting the casing to be moved downwardly readily. Not only does the edge 10 operate, upon a movement of the tool, to enlarge the opening, but, as well, the walls of the opening are reamed out and smoothed by the action of the cutting edges 15 and 16 of the rib 14. Water may be introduced readily into the bore 17, the water finding its way out through the ports 18 and 19, adjacent the cutting edges of the respective portions of the tool.

Having thus described the invention, what is claimed is: —

1. A well drilling tool comprising a plurality of radial wings and a chisel-ended centering bit projecting below the lower edges of the wings and terminating in a single pair of meeting cutting edges which lie in a common plane and diverge from their point of meeting.

2. A well drilling tool comprising a plurality of radial wings, two of which are provided at their lower ends with converging cutting edges and a centering bit projecting beyond the lower edges of the wings, the bit having converging cutting edges alined with the converging cutting edges of said wings.

3. A well drilling tool comprising a plurality of radial wings, and a single eccentric chisel-ended centering bit projecting beyond the ends of the wings and having diverging cutting edges lying in a common plane.

4. A well drilling tool comprising a plurality of lateral wings having straight cutting edges, the outer ends of which lie in a common circumference, and a centering bit projecting beyond the ends of the wings and disposed eccentrically of said circumference, the straight-cutting edges extending unbrokenly inward to the bit.

5. A well drilling tool comprising a plurality of radial wings having chisel shaped cutting edges lying in a common plane and a single, eccentric centering bit projecting beyond the ends of the wings, the transverse cutting edge of one wing being longer than the transverse cutting edge of the other wing.

6. A well drilling tool comprising a plurality of lateral wings having chisel shaped cutting edges lying in a common plane the outer ends of said edges lying in a common circumference, and a centering bit projecting beyond the edges of the wings and disposed eccentrically of said circumference, the transverse cutting edge of one wing being longer than the transverse cutting edges of the other wings.

7. A well drilling tool comprising a plurality of lateral wings and a single, eccentric, centering bit projecting beyond the ends of the wings, the transverse cutting edge of one wing being longer than the transverse cutting edge of the other wing, said wing being provided along its outer edge with a transverse rib, the end of which is sharpened.

8. A well drilling tool comprising a plurality of lateral wings and a single, eccentric, centering bit projecting beyond the ends of the wings, the transverse cutting edge of one wing being longer than the transverse cutting edges of the other wings, said wing being provided at its outer edge with a transverse cutting rib, the lateral edges of which are sharpened.

9. A well drilling tool comprising a plurality of lateral wings and a single, eccentric, centering bit projecting beyond the ends of the wings, the transverse cutting edge of one wing being longer than the transverse cutting edges of the other wings, said wing being provided along its outer edge with a transverse rib, the end of which and one lateral edge of which is sharpened.

10. A well drilling tool comprising a pair of oppositely disposed wings and a pair of wings disposed at an obtuse angle to each other, the wings of the respective pairs terminating in straight, inwardly extended cutting edges, and a depending, centering bit projecting below the wings, the centering bit comprising angularly disposed parts, alined with the obtusely disposed wings, said parts terminating in angularly disposed edges, alined with the cutting edges of the obtusely disposed wings, the cutting edge of one member of the first specified pair of wings being longer than the cutting edge of the other wing of said pair.

In testimony that I claim the foregoing as my own, I have hereto affixed my signature in the presence of two witnesses.

STEPHEN W. SIMS.

Witnesses:
A. T. HATHAWAY,
JOHN FREEMAN.